US007023621B2

(12) United States Patent
Dietrich

(10) Patent No.: US 7,023,621 B2
(45) Date of Patent: Apr. 4, 2006

(54) DEVICE AND METHOD FOR THE LASER PROJECTION OF HIGH-RESOLUTION IMAGES ONTO THE RETINA OF THE EYE, SUPERIMPOSED WITH THE IMAGE CONTENT OF THE FIELD OF VISION

(76) Inventor: Klaus Dietrich, Weinberg-Strasse 31, DE-97469 Gochsheim (DE)

( * ) Notice: Subject to any disclaimer, the term of this patent is extended or adjusted under 35 U.S.C. 154(b) by 0 days.

(21) Appl. No.: 10/479,535

(22) PCT Filed: Jun. 6, 2002

(86) PCT No.: PCT/DE02/02068

§ 371 (c)(1),
(2), (4) Date: Apr. 16, 2004

(87) PCT Pub. No.: WO02/099506

PCT Pub. Date: Dec. 12, 2002

(65) Prior Publication Data

US 2004/0174599 A1  Sep. 9, 2004

(30) Foreign Application Priority Data

Jun. 6, 2001 (DE) ............................... 101 27 367

(51) Int. Cl.
*G02B 27/14* (2006.01)
(52) U.S. Cl. ...................................... 359/631; 359/630
(58) Field of Classification Search ............... 351/158, 351/41, 50; 345/8, 9; 359/631, 630, 633, 359/727, 728, 729
See application file for complete search history.

(56) References Cited

U.S. PATENT DOCUMENTS 5,151,722 A  9/1992  Massof et al.
5,467,104 A  11/1995  Furness, III et al.
5,663,833 A  9/1997  Nanba et al.

OTHER PUBLICATIONS

Manhart, P.K. et al, "A Compact, Solid Schmidt Optical Relay for Helmet Mounted Displays," Proceedings of the Virtual Reality Annual International Symposium, IEEE 1993, pp. 234-245.
Droessler, J.G. et al, "Tilted Cat Helmet-Mounted Display," Optical Engineering, Aug. 1990.
Iwamoto, K. et al, "A Head-Mounted Eye Movement Tracking Display and its Image Display Method," Systems and Computers in Japan, vol. 18, No. 7, 1997, pp. 89-99.

*Primary Examiner*—Hung Xuan Dang
(74) *Attorney, Agent, or Firm*—Smith-Hill and Bedell

(57) ABSTRACT

The optical system as described achieves retinal display of video images at a viewing angle of approx. 60° by a monochromatic or color mixture of laser beams. Retinal display is either direct or by beaming a scattering screen, whereby the display can be superimposed with an image of a 60° field of view. In video image display a convergent beam of light is focussed on the retina with the aid of a partly transparent planoconcave mirror. The system features an extremely high resolution limited only by the eyesight of the viewer and the diffraction of the display light beam as dictated merely by the divergence and cross-section of the light beam.

26 Claims, 6 Drawing Sheets

DEVICE AND METHOD FOR THE LASER PROJECTION OF HIGH-RESOLUTION IMAGES ONTO THE RETINA OF THE EYE, SUPERIMPOSED WITH THE IMAGE CONTENT OF THE FIELD OF VISION

The invention relates to an optical assembly and method for the retinal projection of monochromatic or color video images by a light beam (e.g. composite laser beam) modulated by the brightness of its color components directed by electrically controlling the deflection angle of one or more scanning mirrors over the retina two-dimensionally for crisp sequential pixel imaging. Depending on the retinal projection application this involves either only the video image (head-mounted video display) or the video image superimposed with the image of the field of view of the viewing eye (head-mounted display for pilots). From prior art various optical assemblies are known for achieving this objective, e.g.:

1. "Helmut-mounted displays and sights" Mordekhai Velger, Artech House, Boston/London, 1998
2. "Der Fernseher in der Brille", Elektronik, pages 18, 20, 1999
3. U.S. Pat. No. 6,140,979, Microvision Inc. Oct. 31, 2000

Because of aberration and the configuration in all of these known display systems the video imaging angle achievable at best is only 20–40° in the image diagonal with unsatisfactory image resolution. The system as it reads from 2. shows e.g. the classic arrangement for retinal projection using a concave mirror the spherical aberration of which dominates in greatly diminishing retinal image resolution and whose optical system substantially differs from the basic arrangement of the present invention (cf. arrangement as shown in FIG. 1).

The objective of the present invention was thus to define an optical system which achieves an imaging angle of as high as 60° for a video and superimposed field of view in conjunction with an extremely high image resolution, i.e. now limited only by how well the viewing eye can see and by the diffraction limit of the light beam (laser beam). In the following description the invention is detailed by way of a few examples whilst its basic optical system, its beam configuration and variants thereof are illustrated in the FIGS. 1 to 6 of the drawings.

Figure 1:
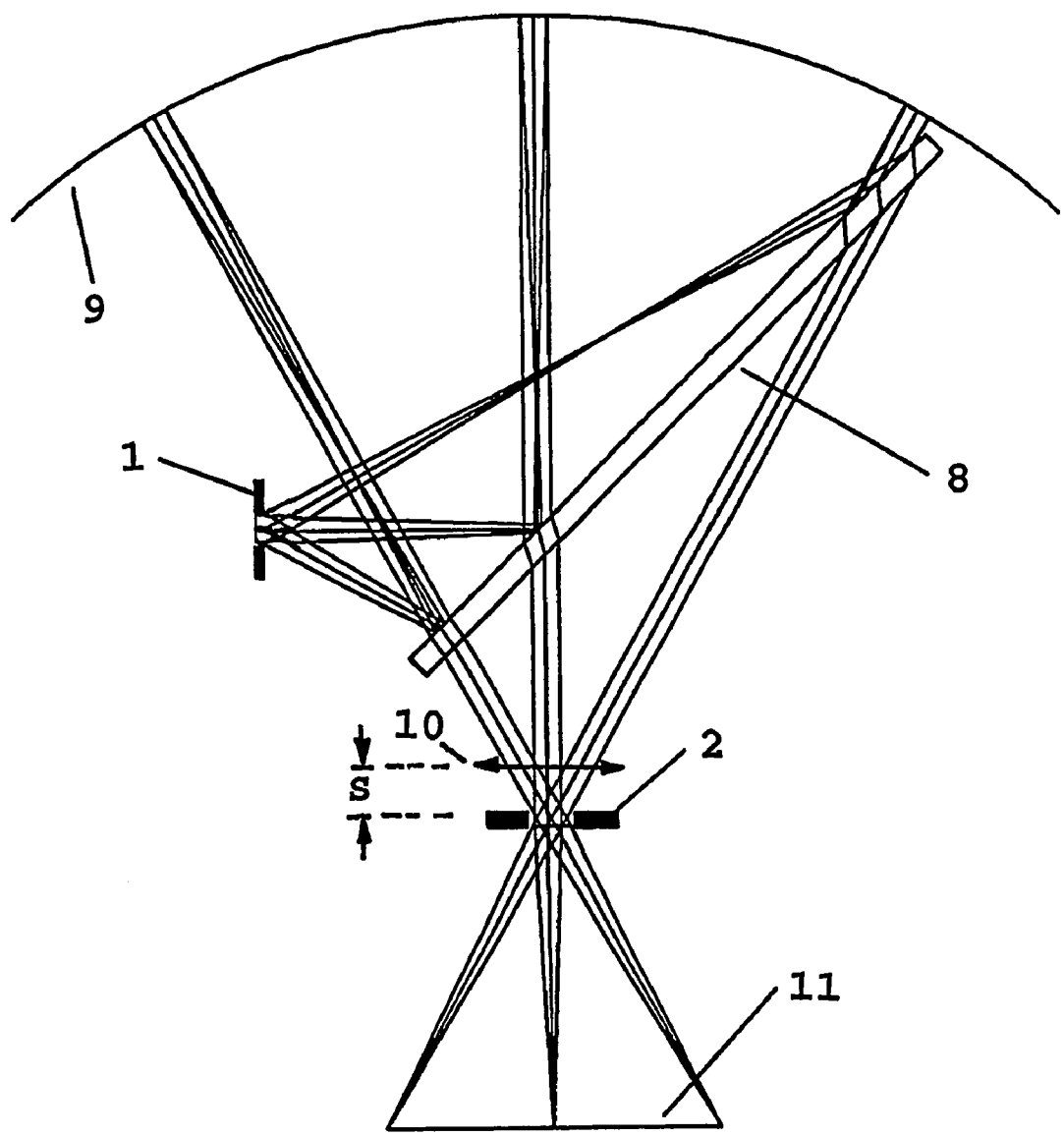
Figure 2:
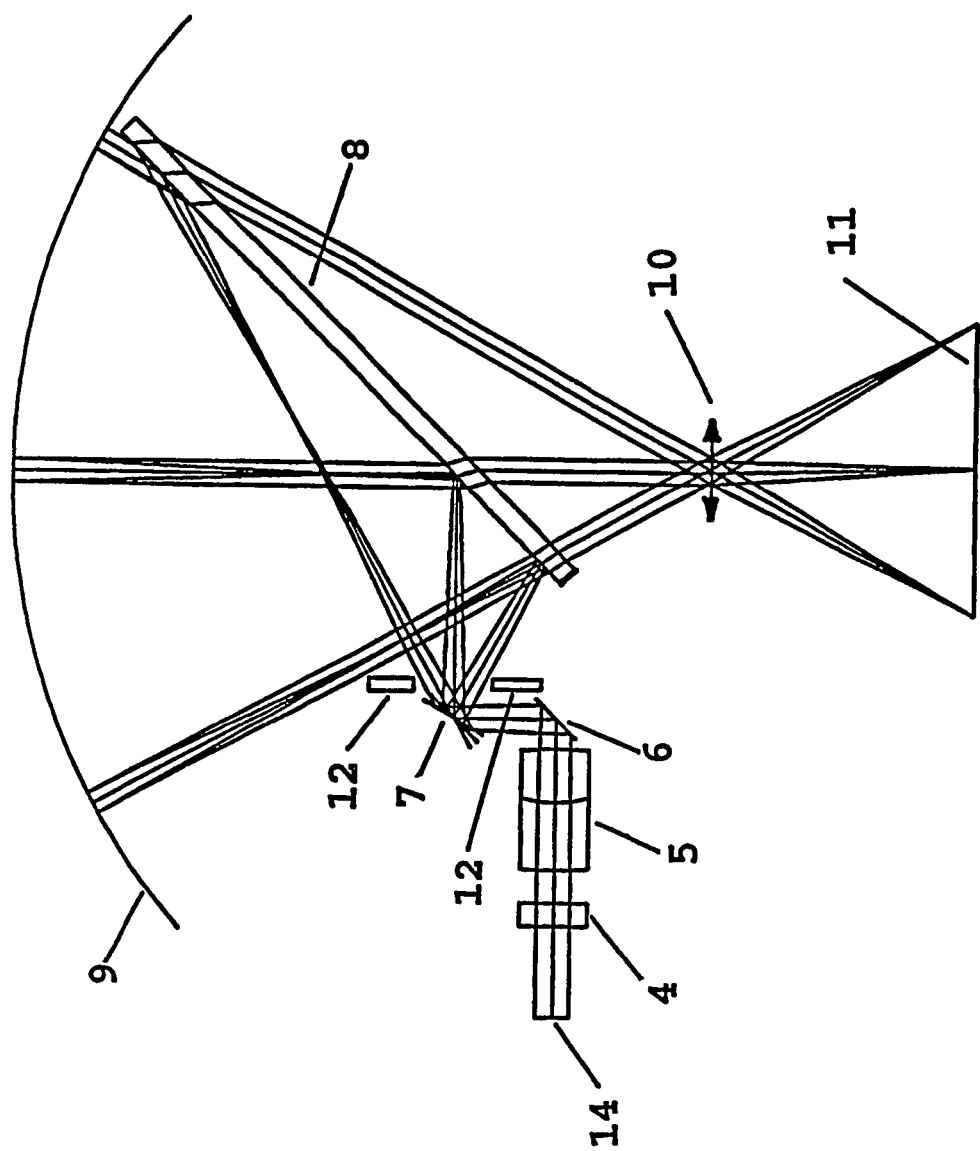
Figure 3:
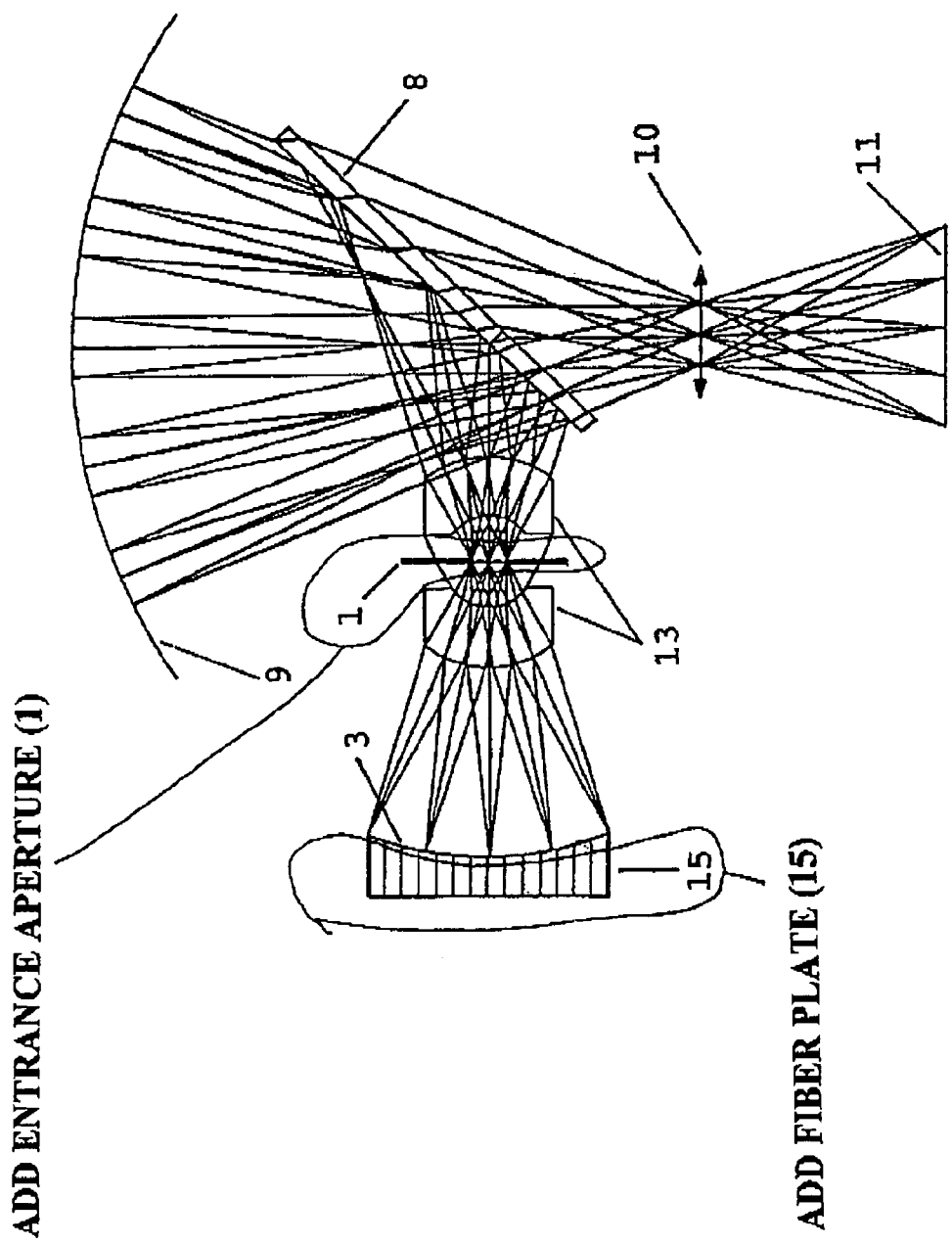

Referring now to FIG. 1 there is illustrated the basic arrangement of the system for high-resolution pixel projection on the retina (11) of the viewing eye, the latter being represented in FIGS. 1 to 3 by an ideal thin lens (10) and a flat retina (11). The light beams belonging to a pixel on the retina (11) (represented in each case by three rays, namely the chief and the two marginal rays) pass converging through the entrance aperture (1) of the system.

For a viewing eye of normal vision and an infinite virtual objective spacing for an image projection the entrance aperture (1) is located in front of the concave mirror (9) by the optical path length R=2f (where f=focal length, R=radius of the concave mirror (9)), i.e. in a virtual spherical centerpoint of the concave mirror (9) generated by the flat beam splitter (8). The light beams converging from the entrance aperture (1) to a pixel on the retina are reflected by the beam splitter (8) to the concave mirror (9), intersect at a point at a distance from the surface of the concave mirror (9) corresponding to the optical path length f=R/2, before then being incident divergent at the concave mirror (9). Each chief ray associated with a retinal pixel is incident perpendicular to the surface of the concave mirror (9). The light beams are reflected there as parallel beams, then passing through the beam splitter (8) and the exit aperture (2) located at the spherical centerpoint of the concave mirror (9) and which is the image of the entrance aperture (1) generated by the concave mirror (9) and beam splitter (8).

Since all light beams associated with a retina pixel are oriented parallel to each other between concave mirror (9) and exit aperture (2) and their chief ray passes through the spherical centerpoint of the concave mirror (9), each light beam of all retina pixels is a paraxial beam of light as regards the concave mirror (9) irrespective of its angle of incidence to the viewing eye. This results in the concave mirror (9) having for the light beams of all retina pixels the same spherical aberration which is very small due to the low f-number (=beam diameter/f).

The beam splitter (8) is located in the parallel beam path and causes only a transversal beam shift but no field curvature aberration or chromatic aberration in the image on the retina (11). The lens (10) is located typically in the exit aperture (2) or slightly in front thereof at a spacing S (S greater than or equal to zero). For a large beam cross-section in the exit aperture (2) and at S>0 retinal projection is also possible even with eye movement without this movement needing to be compensated by the projection system.

When the image of the retinal projection is to be superimposed with the image of the field of view (pilot's HMD) the concave mirror (9) is configured as a partly transparent mirror.

To generate a finite virtual object spacing for the retina projection or for correcting deficient eyesight of the viewing eye the entrance aperture (1) is slightly shifted along its optical axis from the virtual spherical centerpoint of the concave mirror (9). This generates for the light beam reflected by the concave mirror (9) the necessary slight divergence or convergnce of the light beam before entering the lens (10).

Referring now to FIG. 2 there is illustrated a typical assembly for video retinal projection, the retina being identified by the reference number (11). This assumes a monochromatic or color beam of parallel light (e.g. a laser beam mixture) whose color components are modulated by the serial pixel data of a video signal. Further assumed is an electronic signalling device which generates the necessary control signals from the line or image sync signals of the video signal or other pixel coordinate data for steering e.g. a gimballed dual axis scanning mirror (7) so that the light beam is deflected by the necessary azimutal and elevation angle for each pixel of the video signal to make sure that the pixel is projected on the retina (11) of the viewing eye at the desired location. The modulated parallel light beam is directed from the input plane (14), where necessary via an attenuator filter (4), through a single or multiple converging lens system (5) for generating the necessary convergent light beam which is supplied via the deviating mirror (6) to the dual axis scanning mirror (7) arranged in the entrance aperture (1) of the projection system. The scanning mirror (7) as shown in FIG. 2 is simultaneously indicated for three different deflection positions with the corresponding reflected light beams.

The lens system (5) generates the desired convergence of the light beam, but it is also capable of eliminating minor aberrations of the concave mirror (9) since these aberrations in the assembly of the projection system are the same for all retinal pixels irrespective of the angular position of the scanning mirror (7).

To nevertheless allow for eye movement for small light beam cross-sections by the lens (10) in video retinal projection an imaging sensor (12) (image or multi-segment sensor) is arranged surrounding the scanning mirror (7) in the plane of the entrance aperture (1). It is on this sensor that the concave mirror (9) images the surface of viewing eye. From signals of the imaging sensor (12) the location of the viewing eye pupil can be determined and from which in turn signals for steering the servo motors for two-dimensional positioners can be generated with which the optical system as a whole, comprising the elements (14), (4), (5), (6), (7), (12), (8), (9) can be shifted horizontally and vertically so that the exit aperture (2) (cf. FIG. 1) follows viewing eye pupil movement. In addition, the illumination level at the surface of the eye generated by the observed field of view by the concave mirror (9) can be measured from the signals of the imaging sensor (12) in adjusting the required brightness of the video retinal display.

In addition to this, the viewing direction of the viewing eye can be determined from the signals of the imaging sensor (12) as can be exploited for selecting the desired pixel content of the video display by eye-controlled menu toolbar operation.

To prevent the complete projection system from following eye movements the cross-section of the light beam in the plane of the lens (10) needs to be large. This is achievable either with an expansive deflection mirror (7) as shown in FIG. 2 or, as evident from FIG. 3, by generating a primary image on a scattering screen (3) whose wide scattered light cone emanating from each pixel is focused by a lens system (13) (e.g. achromatic ball lens) into convergent light beams, the intersection of which locate on a spherical surface having, the radius R/2 and which would appear to originate from a entrance aperture (1) of larger cross-section as shown in FIG. 3 as coincident with the entrance aperture of the display system as shown in FIG. 1, in thus enabling the primary image to be imaged on the retina (11). As evident from FIG. 3 it is not every chief ray that is beamed precisely perpendicular to the surface of the concave mirror (9). Such minor deviations ate, however, tolerable without any serious loss of focus in the image on the retina (11).

Figure 4:
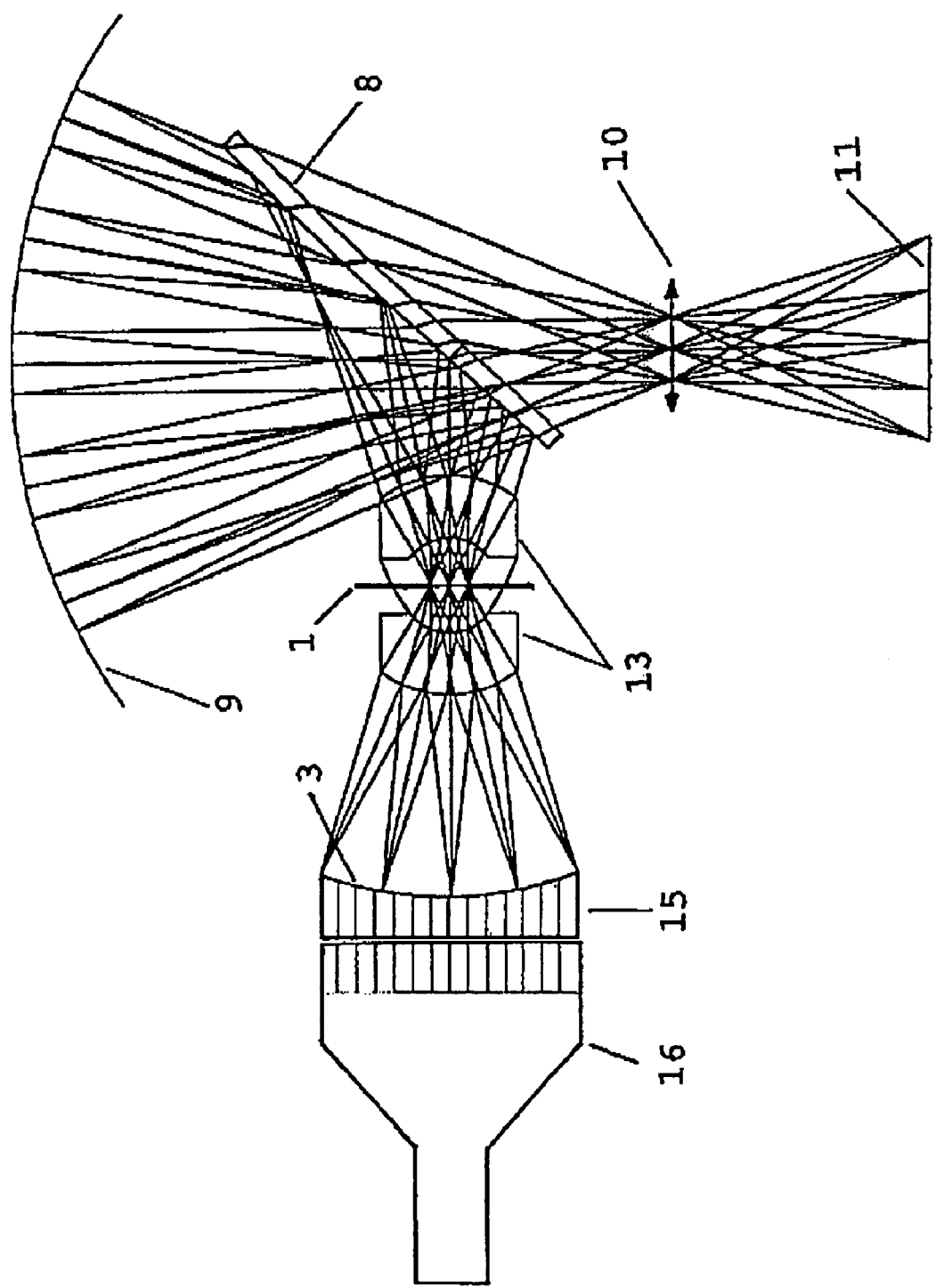
Figure 5:
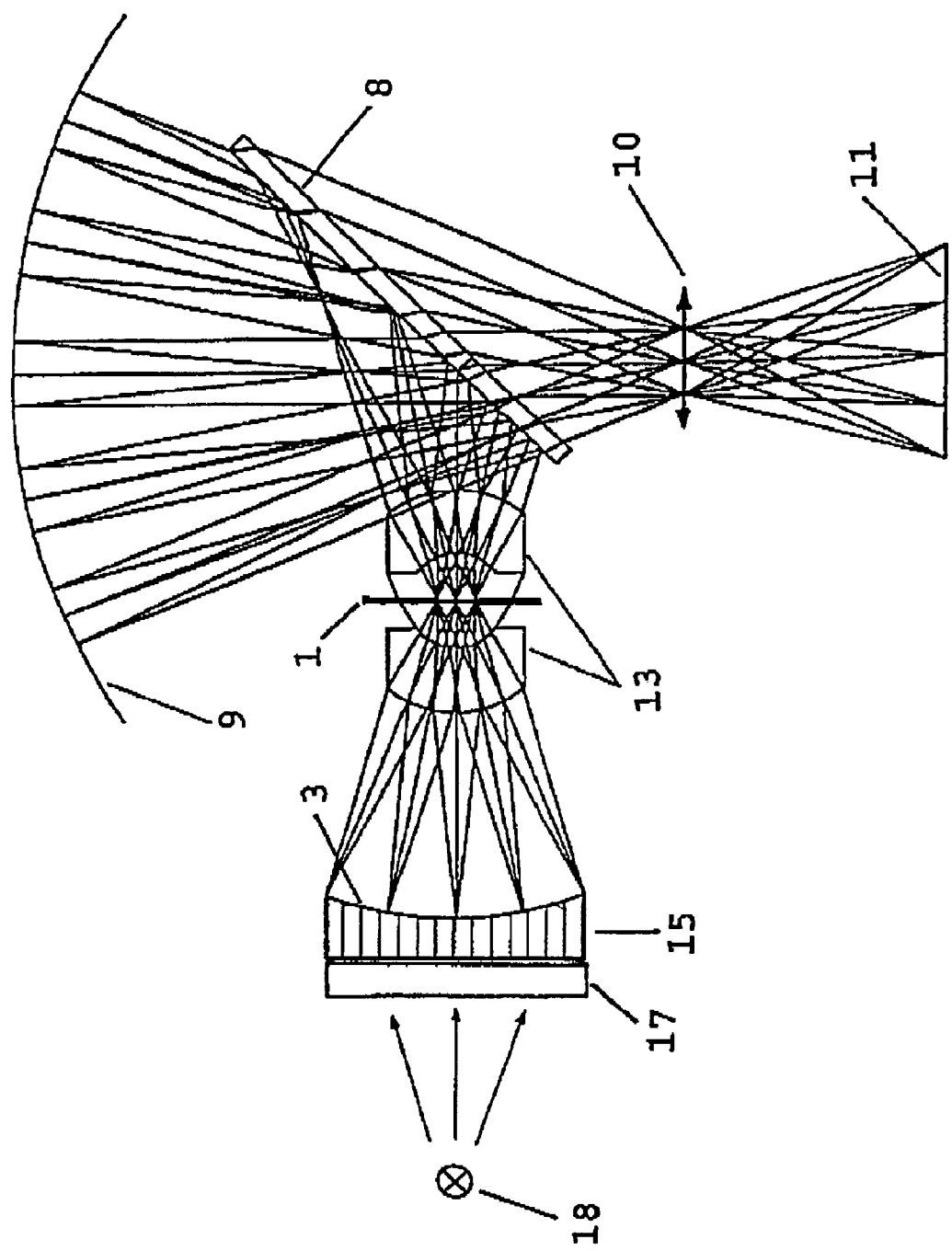
Figure 6:
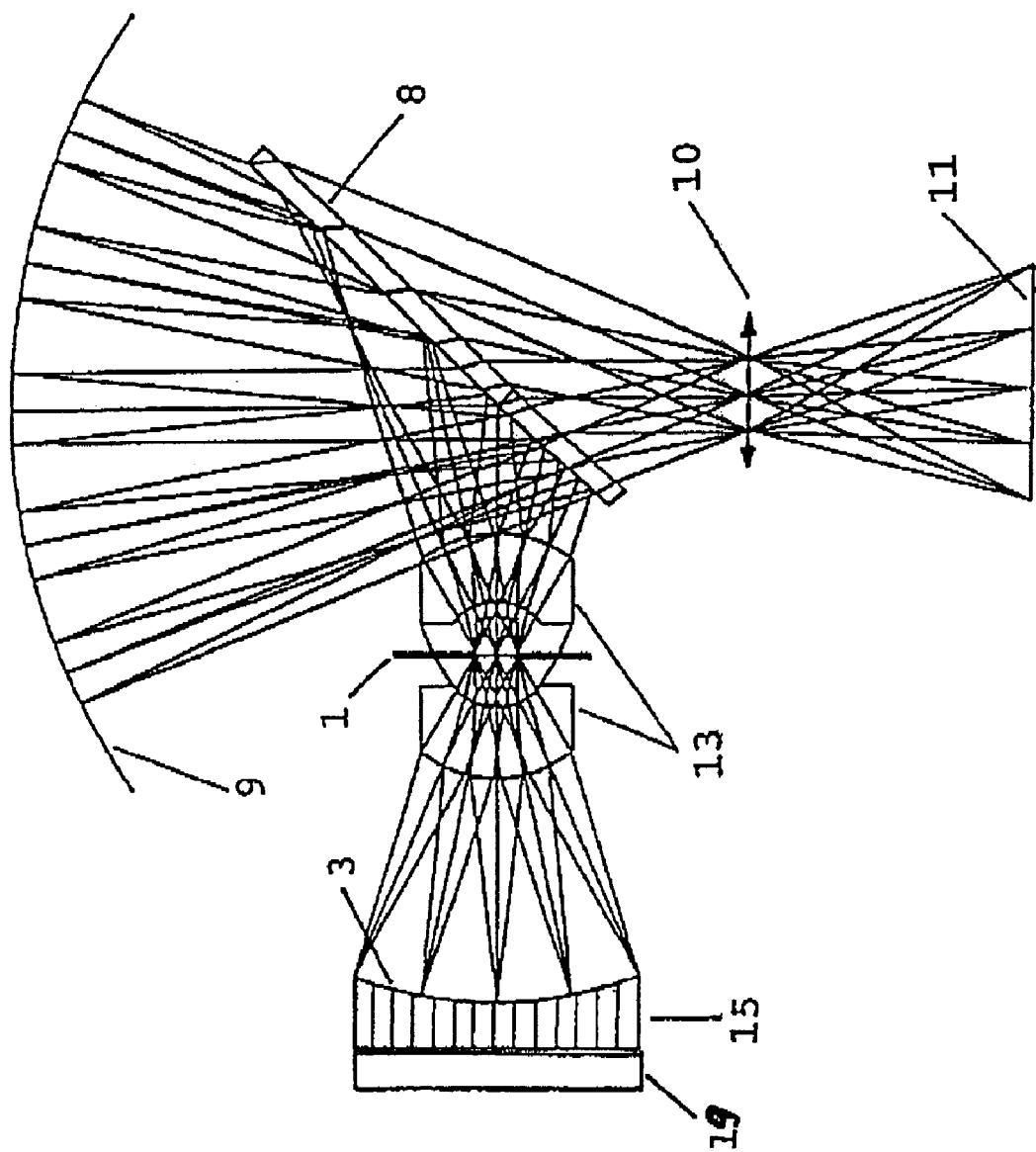

Referring to FIGS. 4, 5 and 6, generating the primary image on the display screen (3) is possible as follows:

1. The primary image is scanned onto the screen (3) by a light beam modulated in intensity with the aid of a dual-axis scanning mirror system.
2. The scattering screen (3) is the output surface of a fiber plate (15) on the input side of which the primary image is
   a) scanned by a light beam modulated in intensity with the aid of a dual-axis scanning mirror system,
   b) input by CRT (FIG. 4, 16), LCD (FIG. 5, 17) or plasma display (FIG. 6, 19) and transferred by the optical fibers to the output side (3) of the fiber plate (15) emitted scattered.

The invention claimed is:

1. An optical assembly for retinal projection of electronic image data on a viewing eye having a lens and a retina, the electronic image data being transmitted by a light beam, the assembly having an entrance aperture and an exit aperture and comprising:
   a focusing lens for receiving the light beam and focusing the light beam into a convergent beam which passes through the entrance aperture,
   a scanning mirror means for receiving the convergent beam from the focusing lens and scanning the beam along first and second mutually perpendicular axes,
   a beam splitter for receiving and reflecting the beam from the scanning mirror means, and
   a concave mirror positioned for receiving the reflected beam from the beam splitter at substantially perpendicular incidence and reflecting the beam towards the eye, the concave mirror being disposed forward of the eye's lens, wherein the light beam has a principal ray that intersects the midpoint of the entrance aperture and is perpendicularly incident on the concave mirror,
   wherein the beam splitter and the concave mirror image the entrance aperture on the exit aperture which is located in the eye at the position of the eye's lens or slightly behind the eye's lens.

2. An optical assembly according to claim 1, wherein the focusing lens corrects minor aberrations of the concave mirror.

3. An optical assembly according to claim 1, wherein the concave mirror is shaped as a partial sphere.

4. An optical assembly according to claim 3, wherein the concave mirror has spherical radius R and the focusing lens focuses the light beam to a point at an optical distance of R/2 from the surface of the concave mirror.

5. An optical assembly according to claim 1, wherein the concave mirror is partly transparent allowing the viewing eye to see the electronic image data superimposed on a field of view as seen by the eye through the partly transparent concave mirror.

6. An optical assembly for retinal projection of electronic image data on a viewing eye, the eye having a lens and a retina, the assembly having an entrance aperture and an exit aperture and comprising:
   a curved scattering screen for displaying an image comprising a plurality of pixels, each pixel being the source of a divergent light beam,
   an achromatic ball lens for focusing a divergent light beam received from the curved scattering screen into a convergent light beam that passes through the entrance aperture,
   a beam splitter for receiving and reflecting the light beam from the entrance aperture, and
   a concave mirror positioned for receiving reflected light from the beam splitter at substantially perpendicular incidence and reflecting the light towards the eye and being disposed forward of the eye's lens, wherein each convergent light beam has a principal ray that intersects the midpoint of the entrance aperture and is perpendicularly incident on the concave mirror,
   wherein the beam splitter and the concave mirror image the entrance aperture on the exit aperture located in the eye at the position of the eye's lens or slightly behind the eye's lens.

7. An optical assembly according to claim 6, wherein the curved scattering screen is a fiber plate, the fiber plate having an input side and an output side, the output side being the first side of the curved scattering screen.

8. An optical assembly according to claim 7, further comprising an image transmission means for writing an image to be projected on to the viewing eye on the input side of the fiber plate.

9. An optical assembly according to claim 8, wherein the input and output sides of the fiber plate are curved surfaces.

10. An optical assembly according to claim 8, wherein the image transmission means comprises a cathode ray tube.

11. An optical assembly according to claim 8, wherein the image transmission means comprises an illuminated liquid crystal display.

12. An optical assembly according to claim 8, wherein the image transmission means comprises a plasma display screen.

13. An optical assembly according to claim 6, wherein the concave mirror is shaped as a partial sphere.

14. An optical assembly according to claim 13, wherein the concave mirror has spherical radius R and the achromatic ball lens focuses the light beams to points at an optical distance of R/2 from the surface of the concave mirror.

15. An optical assembly according to claim 6, wherein the concave mirror is a partly transparent mirror so that the viewing eye sees the electronic image data superimposed on a field of view as seen by the eye through the partly transparent concave mirror.

16. A method for retinal projection of electronic image data on a viewing eye having a lens and a retina, the electronic image data being transmitted by a light beam and the method comprising the steps of:

focusing the light beam into a convergent light beam, scanning the convergent light beam along first and second mutually perpendicular axes, reflecting the scanning light beam towards a concave reflective surface that is positioned to receive the scanning light beam and reflect the light beam towards the viewing eye, and imaging an entrance aperture on an exit aperture which is located in the eye, at the position of the eye's lens or slightly behind the eye's lens, wherein the light beam has a principal ray that intersects the midpoint of the entrance aperture and is perpendicularly incident on the concave reflective surface.

17. A method according to claim 16, wherein the concave reflective surface is shaped as a partial sphere with radius R and the convergent light beams are focused at an optical distance of R/2 plus D, D being zero for a viewing eye with normal eyesight and non-zero for a viewing eye with deficient eyesight, before reaching the surface of the concave mirror.

18. A method according to claim 16, employing a lens to focus the light beam, a scanning mirror means to scan the convergent light beam, and a beam splitter to reflect the scanning light beam, and wherein the concave reflective surface images the entrance aperture at the exit aperture, and the method further comprises the steps of sensing movement of the viewing eye and, if such movement is sensed, moving the lens, the scanning mirror means, the beam splitter and the concave reflective surface to compensate for such movement.

19. A method according to claim 18, further comprising the steps of defining a plurality of angle fields that the viewing eye may be disposed in and determining the orientation of the viewing eye, enabling the viewing eye to influence the content of the electronic image by being oriented in one of the defined angle fields.

20. A method according to claim 16, further comprising the steps of measuring the illumination on the viewing eye and adjusting the brightness of the electronic images in response to the measurement of illumination.

21. A method according to claim 16, wherein the step of scanning the convergent light beam comprises reflecting the light beam at a particular angle such that the beam impacts a desired location on the retina.

22. A method for retinal projection of electronic image data on a viewing eye having a lens and a retina, the method comprising the stops of:

displaying the image on a curved scattering screen, focusing divergent light beans from the curved scattering screen through the entrance aperture into convergent light beams employing an achromatic ball lens, reflecting light beams received from the entrance aperture towards a concave reflective surface that is positioned to receive the reflected light beams and reflect the light towards the viewing eye, and imaging an entrance aperture on an exit aperture which is located in the eye, at the position of the eye's lens or slightly behind the eye's lens, wherein each light beam has a principal ray that intersects the midpoint of the entrance aperture and is perpendicularly incident on the concave reflective surface.

23. A method according to claim 22, wherein the concave reflective surface is shaped as a partial sphere with radius R and the light beams are focused such that they intersect at an optical distance of R/2 plus D, D being zero for a viewing eye with normal eyesight and non-zero for a viewing eye of deficient eyesight, before reaching the concave reflective surface.

24. A method according to claim 22, wherein a beam splitter is provided to reflect the light beams, and the concave reflective surface images the entrance aperture on the exit aperture, and the method further comprises the steps of sensing movement of the viewing eye and, if such movement is sensed, moving the lens, the achromatic ball lens, the beam splitter and the concave reflective surface to compensate for such movement.

25. A method according to claim 24, further comprising the steps of defining a plurality of angle fields that the viewing eye may be disposed in and determining the orientation of the viewing eye, enabling the viewing eye to influence the content of the electronic image by being oriented in one of the defined angle fields.

26. A method according to claim 22, further comprising the steps of measuring the illumination on the surface of the viewing eye and adjusting the brightness of the electronic images in response to the measurements of illumination.

* * * * *